Sept. 29, 1959  F. J. RUSSELL  2,906,490
TELESCOPIC JACK POST
Filed April 9, 1956  2 Sheets-Sheet 2
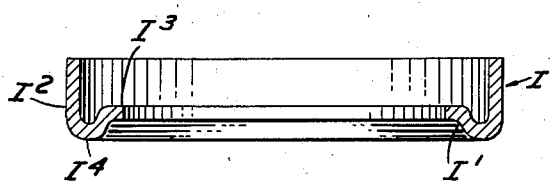
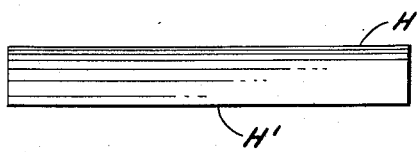
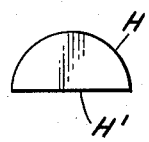
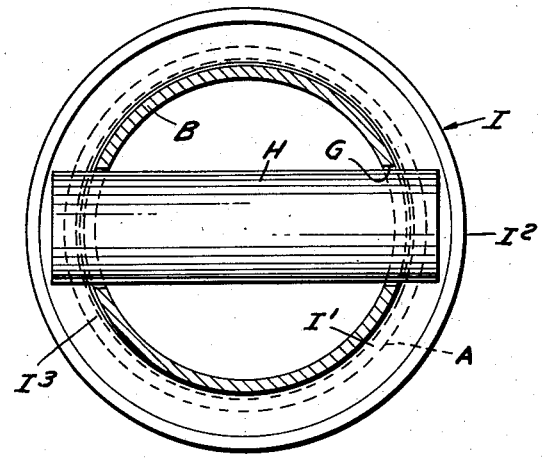
INVENTOR.
FRED J. RUSSELL
BY
ATTORNEYS

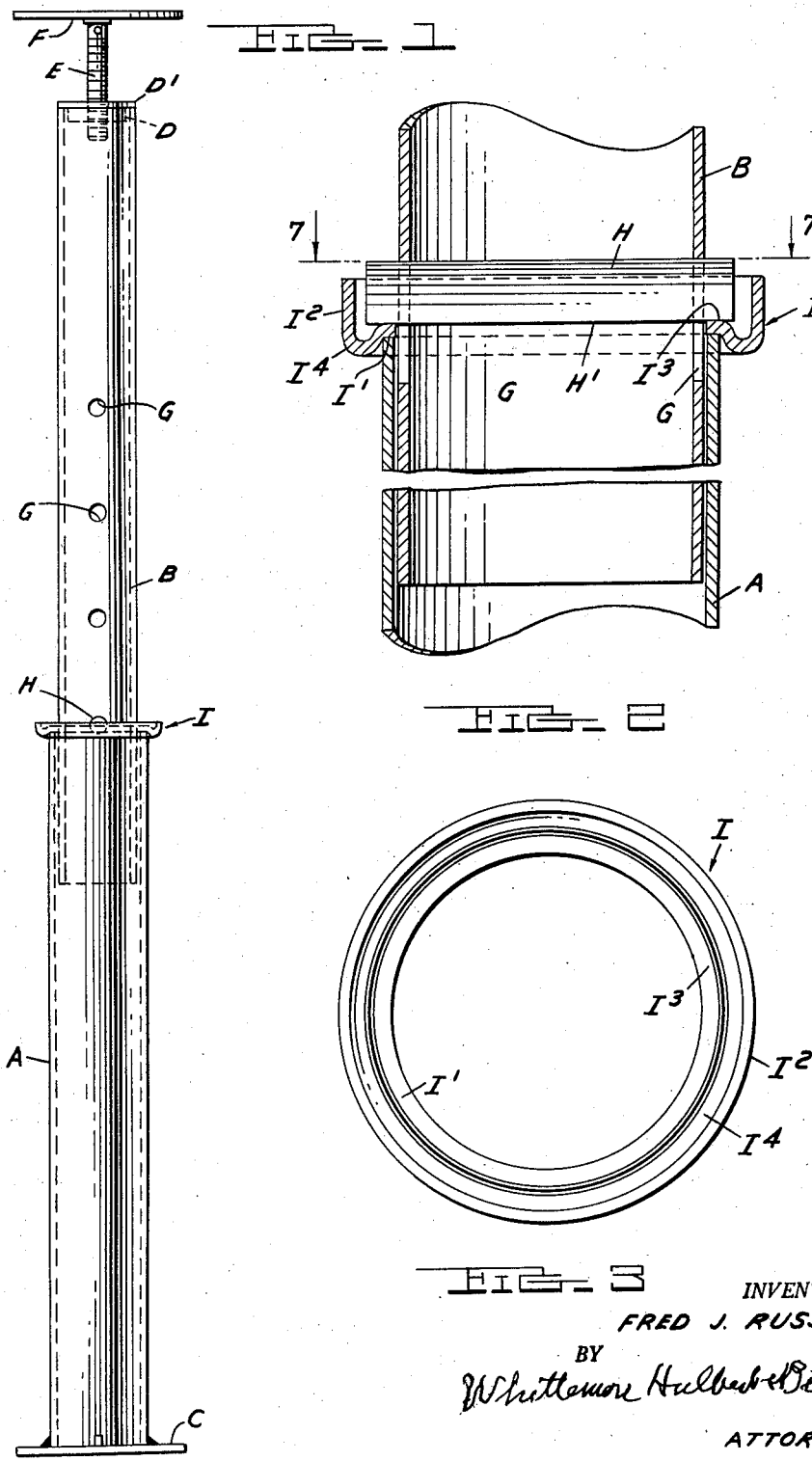

United States Patent Office 2,906,490
Patented Sept. 29, 1959

2,906,490

TELESCOPIC JACK POST

Fred J. Russell, Los Angeles, Calif., assignor to Inland Steel Products Company, Milwaukee, Wis., a corporation of Delaware Application April 9, 1956, Serial No. 576,910

8 Claims. (Cl. 248—354)

The invention relates to jack posts designed for use in buildings to strengthen the same. Heretofore such structures have been made including telescopically engaged tubes held in different positions of relative longitudinal adjustment by cross pins alternatively engaging spaced apertures in one or both of the tubes and projecting beyond the diameter of the smaller tube for engaging the larger one. One of the tubes is further provided at its outer end with a nut member which is engaged by a threaded rod. A swivel plate is secured to the outer end of the rod and a bearing plate to the opposite end of the telescopically engaged tubes. Thus, large relative adjustments of the tubes may be made by shifting the pin, and smaller adjustments to fit the space and take up the load are made by rotating the threaded rod.

One defect of the construction as thus far described is that the pin has a relatively small area of contact with the tubes so that under heavy loads there may be deformation in one or both of these tubes. It is the object of my invention to avoid this defect and to this end the invention consists in the construction as hereinafter set forth.

In the accompanying drawings:

Fig. 1 is an elevation of my improved construction of jack post.

Fig. 2 is a central longitudinal section of the telescopically engaged tubes, the cross pin for coupling the same and a collar cooperating therewith for transferring the load.

Fig. 3 is a plan view of the collar.

Fig. 4 is a cross section thereof.

Fig. 5 is a side elevation of the pin.

Fig. 6 is an end elevation thereof.

Fig. 7 is a cross section on line 7—7, Fig. 2.

The main body of the jack is formed of telescopically engaged tubing members A and B which fit each other as closely as possible with standard commercial tubing. The larger tube A has a base plate C welded or otherwise secured to its lower end. The smaller tube B has at its upper end a nut member D fitting the same with a supporting annular flange D' engaging the end of the tube. E is a threaded rod engaging the nut D and F is a plate swiveled upon the upper end of said rod. The tube B is provided with a series of spaced pairs of diametrically opposite apertures G through the walls thereof for alternatively receiving a cross pin H. The latter is preferably half round in cross section so as to present a flat underface H' extending in the same plane throughout its length. The length of the pin is somewhat greater than the external diameter of the larger tube A. To transmit the load from one tube to the other I have provided in addition to the pin H a collar I. This is of an internal diameter for fitting about the smaller tube B and is fashioned in cross section to present reverse cups I' and I². The cup I' has a portion I³ resting upon the upper end of the large tube A and a downwardly extending portion I⁴ which fits about said tube to hold the collar concentric therewith. The cup portion I² extends upward above the portion I³ and over the ends of the pin H. Thus when not under load the pin H may be shifted to engage any one of the pairs of apertures G through which it is freely insertable but when under load the cup portion I² of the collar will hold the pin against endwise movement or disengagement from the tubes. As the lower face of the pin is flat it will rest diametrically upon the portion I³ of the collar I while the load carried into this collar will be distributed all around the same into the tube A. The extent of surface is sufficiently large to avoid any deformation by the maximum load carried by the jack.

Due to the fact that there is some clearance between the outer surface of the small tube and the inner surface of the larger tube, these tubes when under load may be deflected slightly out of alignment. However, the fact that the load is transmitted from the flat surface of the pin into the collar and is distributed all around the end of the larger tube, this will have the effect of returning the tubes into more exact alignment.

What I claim as my invention is:

1. In a jack a pair of telescopically engaged tubes, the smaller tube having a series of longitudinally spaced pairs of aligned bores through opposite wall portions thereof, a pin for alternatively engaging said pairs of bores and projecting beyond the same at both ends, a collar having reverse annular cups therein sleeved on said smaller tube bearing on one side thereof against an end of the larger tube and on its opposite side against the projecting portions of said pin, and means on said collar overlapping opposite ends of said pin for holding the same from endwise displacement while under load.

2. The construction as in claim 1 in which one of said reverse cups forms an annular flange which forms said means for overlapping the opposite ends of said pin and holding the same from endwise displacement.

3. The construction as in claim 2 in which a second of said reverse cups fits and overlaps the end portion of said large tube.

4. The construction as in claim 3 in which said collar has an annular inner portion in a plane for resting on the end of the larger tube.

5. The construction as in claim 4 in which said collar is a sheet metal stamping.

6. The construction as in claim 1 in which said pin is of uniform segmental circular cross section throughout its length.

7. The construction as in claim 6 in which said pin has a flat face resting on said collar.

8. The construction as in claim 7 in which said pin is half circular in cross section throughout its length forming said flat face.

References Cited in the file of this patent

UNITED STATES PATENTS

| | | |
|---|---|---|
| 1,381,663 | Roeder | June 14, 1921 |
| 2,147,284 | Doane | Feb. 14, 1939 |
| 2,368,385 | Symons | Jan. 30, 1945 |
| 2,510,328 | Black | June 6, 1950 |
| 2,675,256 | Cornell | Apr. 13, 1954 |
| 2,777,660 | Albrecht | Jan. 15, 1957 |

FOREIGN PATENTS

| | | |
|---|---|---|
| 162,066 | Switzerland | Aug. 1, 1933 |
| 172,279 | Switzerland | Dec. 17, 1934 |
| 980,569 | France | Dec. 27, 1950 |